Dec. 12, 1961     J. A. CLARK ET AL     3,012,437
DEVICE FOR GAUGING, METERING OR MEASURING LIQUIDS
Filed April 18, 1958     2 Sheets-Sheet 1
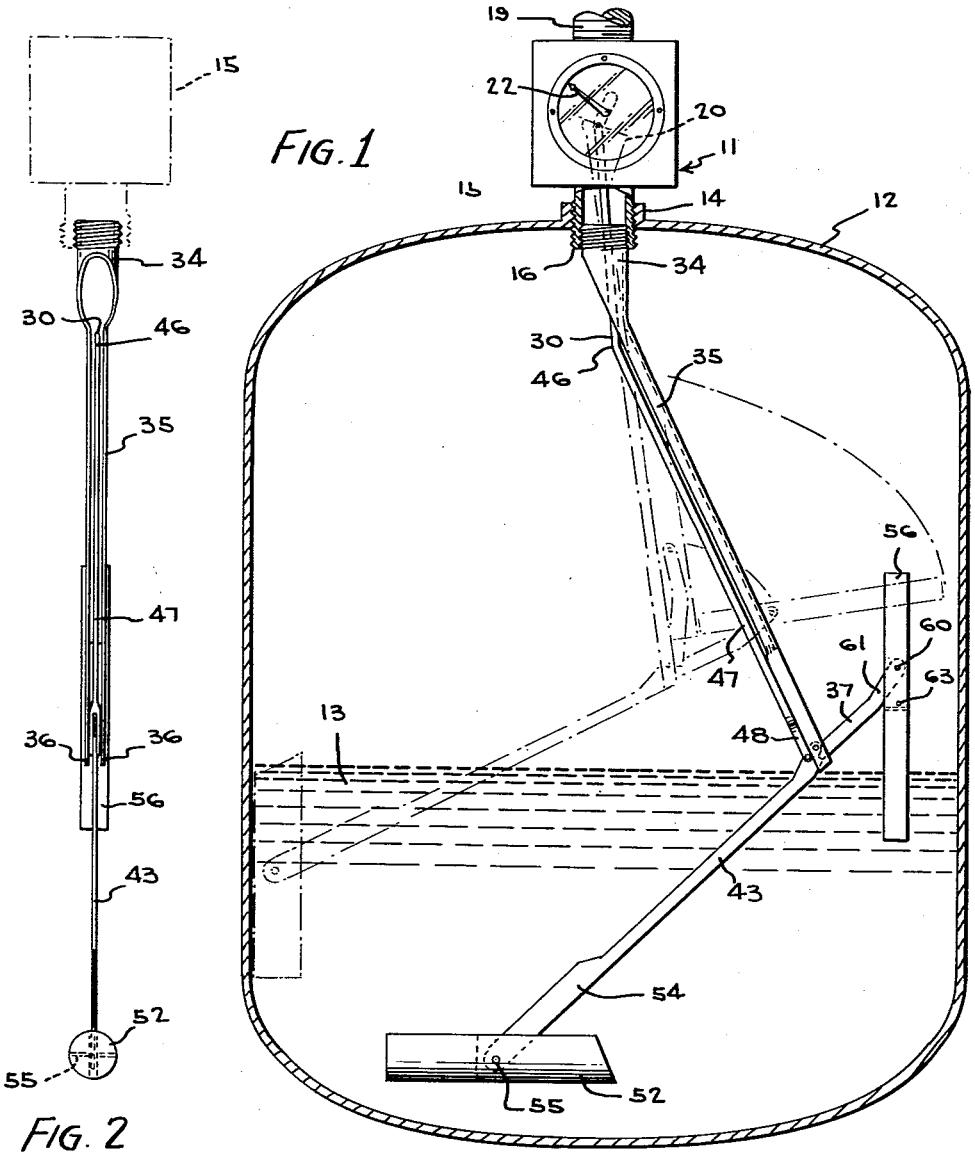
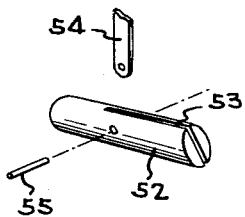
INVENTORS
JAMES A. CLARK
JOHN O. MORRISON
ATTORNEYS Dec. 12, 1961  J. A. CLARK ET AL  3,012,437
DEVICE FOR GAUGING, METERING OR MEASURING LIQUIDS
Filed April 18, 1958  2 Sheets-Sheet 2
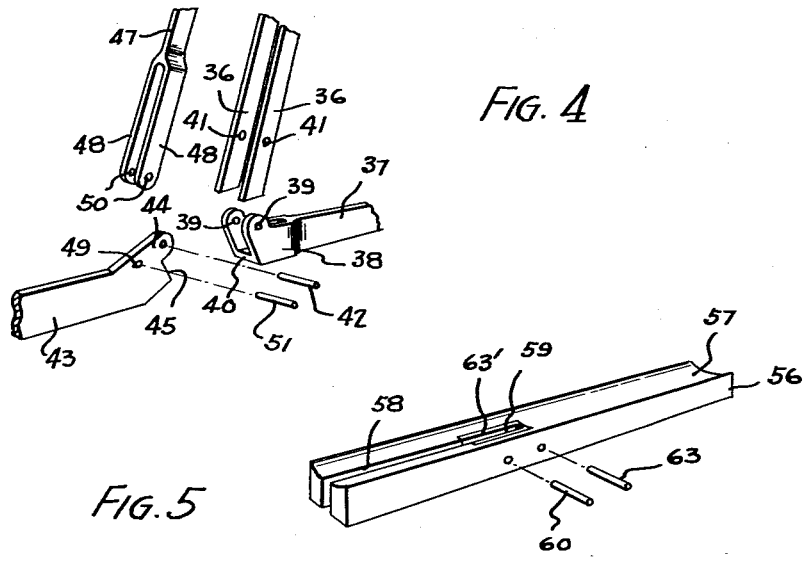
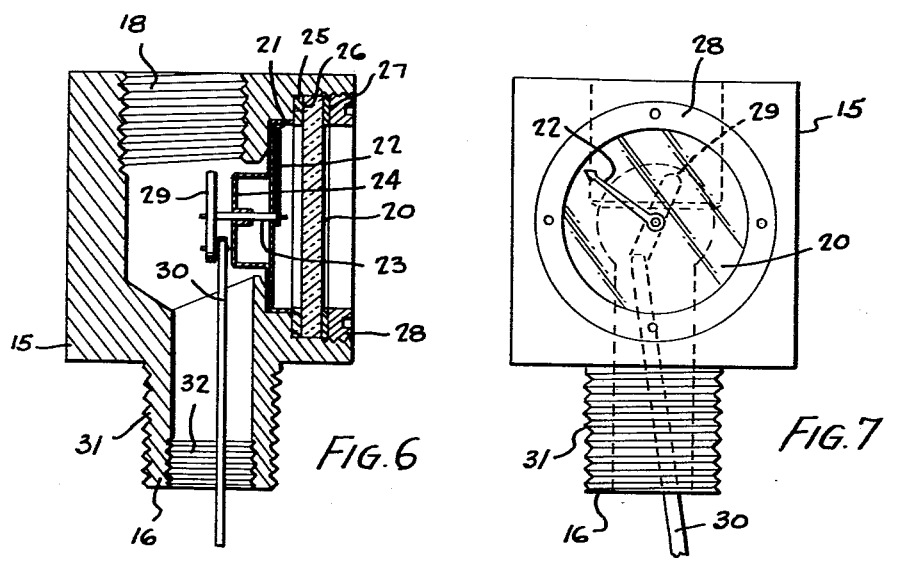
INVENTORS
JAMES A. CLARK
JOHN O. MORRISON
BY
McMorrow, Berman & Davidson
ATTORNEYS

United States Patent Office 3,012,437
Patented Dec. 12, 1961

3,012,437
DEVICE FOR GAUGING, METERING OR MEASURING LIQUIDS
James A. Clark, 1143 W. Diamond St., Butte, Mont., and John O. Morrison, Butte, Mont. (108 S. 7th St., Worland, Wyo.)
Filed Apr. 18, 1958, Ser. No. 729,392
6 Claims. (Cl. 73—317)

This invention relates to devices for measuring, metering or gauging liquids, and more particularly to a device for measuring, gauging or ascertaining the level of a liquid having a density less than that of water.

The main object of the invention is to provide a novel and improved liquid gauge device which is simple in construction, which is easy to install in a tank or other vessel containing a liquid to be measured, and which provides accurate and reliable indications of the level of liquid in the container.

A further object of the invention is to provide an improved device for measuring, metering, gauging, or ascertaining the level of a liquid in a container, for example, a liquid having a density less than that of water, the device involving inexpensive components, being rugged in construction, and providing accurate readings.

A still further object of the invention is to provide an improved liquid level gauge device adapted to be employed with a container of liquid having a density less than that of water, for example, a hydrocarbon liquid or any other liquid either at normal atmospheric pressure or at a substantial sustained pressure, the device being especially useful for measuring the liquid level of compressed gases liquefied under pressure, the device being foldable to a relatively compact cross-sectional area so that it may be easily installed in a tank having a small neck, being highly sensitive to changes in liquid level in the container, and involving relatively few parts.

Further objects and advantages of the invention will become apparent from the following description and claims, and from the accompanying drawings, wherein:

FIGURE 1 is a vertical cross-sectional view taken through a tank provided with an improved liquid gauge device constructed in accordance with the present invention.

FIGURE 2 is a front elevational view of the liquid level-responsive portion of the gauge mechanism employed in the device of FIGURE 1.

FIGURE 3 is a fragmentary perspective view showing the manner in which the counterweight member of the gauge mechanism is pivotally connected to the free end of its associated lever member.

FIGURE 4 is a perspective view showing the manner in which the respective lever members are pivotally connected to the depending bracket arm and to the link rod of the gauge mechanism, the parts being shown in separated positions immediately prior to assembly thereof.

FIGURE 5 is a perspective view of the float member and associated pins, as employed in the gauge mechanism of FIGURE 1.

FIGURE 6 is an enlarged vertical cross-sectional view taken through the gauge housing of the mechanism of FIGURE 1.

FIGURE 7 is a front elevational view of the gauge housing shown in FIGURE 6, to the same scale as FIGURE 6.

Referring to the drawings, 11 generally designates a liquid gauge device according to the present invention, said device being adapted to be mounted in a tank containing liquid to be measured, for example, a tank 12 containing liquid 13 which is of a density less than that of water, for example, a hydrocarbon liquid, such as butane, or the like. The container 12 is of conventional construction and is provided with a neck 14 located substantially centrally in its top wall, the neck being provided with internal threads, as is clearly shown in FIGURE 1.

The gauge device 11 comprises a support member 15 in the form of a generally rectangular housing, as shown in FIGURES 6 and 7, the housing being provided with a depending, externally threaded conduit element 16 which is threadedly engageable in the internally threaded neck portion 14 of the tank 12, whereby to secure the gauge device to the tank.

As will be presently explained, the mechanism is arranged so that it may be inserted into the tank through the neck portion 14 prior to the securement of the depending conduit member 16 in the internally threaded neck 14.

The housing 15 is provided with the internally threaded opening 18 in its top wall, said opening being adapted to be connected to a suitable conduit 19 through which the gas or vapor from the liquid in tank 12 may be delivered, through suitable valve means to the equipment utilizing same.

The housing 15 is provided with a transparent window 20 which is sealingly secured in the front wall of the housing and which provides a view of a calibrated dial 21 and a rotatable pointer 22 mounted on a horizontal shaft 23 journaled concentrically with respect to the dial 21 and rotatably supported on a suitable bracket 24 secured in the front wall of housing 15 behind the dial plate 21.

As shown in FIGURE 6, the front wall of the housing 15 is formed with a cylindrical recess 25 which is slightly larger than the recess containing the dial 21, the transparent circular window 20 being sealingly secured in the recess 25 between respective annular sealing gaskets 26 and 27 by a clamping ring 28 threadedly engaged in the outer portion of the cylindrical recess 25.

Rigidly secured on the inner end portion of the pointer shaft 23 is a crank arm 29, and pivotally connected to one end portion of the crank arm 29 is a link rod 30 which extends downwardly through the depending conduit portion 16 of the housing 15. As will be apparent from FIGURES 6 and 7, endwise movement of the link rod 30 rotates the arm 29, causing the pointer shaft 23 to similarly rotate, carrying the pointer 22 therewith over the dial plate 21, whereby the pointer will designate a level of liquid in accordance with the movement of the link rod 30, in a manner presently to be described.

The depending conduit portion 16 is formed with the external threads 31, which, as above described, are threadedly interengageable with the internal threads in the neck 14 of tank 12. The depending conduit portion 16 is also formed with internal threads 32 which threadedly receive a tubular supporting member 34, said supporting member being integrally formed with the downwardly and laterally inclined depending arm 35, said depending arm being of generally semi-circular cross-sectional shape. At its lower end the arm 35 is formed with the parallel, apertured finger elements 36, 36, shown in FIGURE 4.

Designated at 37 is a relatively short lever member which at one end thereof is formed with an enlarged portion 38 which is recessed so that it opens at its top and forward portions, the side walls thereof being extended to define a pair of parallel apertured lugs 39, 39 and the bottom wall thereof terminating in a transverse edge 40.

The lugs 39, 39 are receivable between the finger elements 36, 36, the apertures in the lugs being registrable with the apertures 41, 41 of said finger element to receive a transverse pivot pin 42, shown in FIGURE 4.

Designated at 43 is a relatively long lever member which is formed at one end thereof with an apertured lug 44 receivable between the lugs 39, 39, the aperture thereof being registrable with the apertures in the lugs 39, 39 and with the apertures 41, 41, to receive the pivot pin 42. The end portion of the long lever 43 is likewise formed below the lug 44 with a shoulder 45 which is engageable with the transverse edge 40 of enlarged end portion 38 of the short lever 37, for a purpose presently to be described.

As shown in FIGURE 1, the link rod 30 is formed with a bend 46 at its intermediate portion, whereby the lower portion 47 of the rod is inclined so as to be substantially parallel to the inclined portion 35 of the bracket member 34. Thus, the inclined portion 47 is located adjacent to the concave channel of the member 35 and may at times be received therein, for example, when the gauge device is being installed in the tank 12.

The inclined rod portion 47 is formed at its lower end with a pair of parallel apertured finger elements 48, 48 between which the end portion of the lever 43 is receivable, said end portion being formed with an aperture 49 registrable with the apertures 50, 50 of the finger members 48, 48 to receive a transverse pivot pin 51, whereby lever member 43 may be pivotally connected to the link rod 30. In the assembled positions of the parts, the finger elements 48, 48 are pivotally connected to the lever 43 at the aperture 49 of said lever, which is spaced a relatively short distance from the pivoted aperture in the lug 44 thereof.

As shown in dotted view in FIGURE 1, the lever 43 may be rotated at times to a position substantially in alignment with the arm portion 35, and the short lever 37 may be at this time rotated upwardly to a position closely adjacent the arm portion 35 so as to present a transverse cross sectional area sufficiently small to pass through the neck 14 of the tank when the gauge device is being installed thereon.

Designated at 52 is a counterweight member which is generally cylindrical in shape and which is made of relatively light metal, such as magnesium, or the like. The member 52 is formed with a longitudinal slot 53 of substantial length running axially through the member beyond its mid point, as is clearly shown in FIGURE 1, the slot 53 receiving the flat end portion 54 of the relatively long lever 43. Said flat end portion 54 is pivotally connected to the member 52 by a transverse pivot pin 55, whereby the member 52 is freely rotatable with respect to the lever member 43, and whereby the member 52 may be at times rotated to a position in alignment with the lever member 43, such as is shown in dotted view in FIGURE 1, to allow the member 52 to pass through the neck 14 of the tank 12 during the installation of the gauge device. The pivot pin 55 is located substantially on an axis containing the center of gravity of the member 52 so that said member 52 tends to assume a horizontal position at all times when in use.

Designated at 56 is a float member of suitable heavy metal, such as lead, or the like, said float member being in the form of an elongated bar, as shown in FIGURE 5, formed with the concave top surface 57. The bar 56 is formed with the vertical central slot 58 extending a substantial distance longitudinally therethrough and terminating at an enlarged rectangular opening 59 formed in the intermediate portion of the bar member.

The relatively short lever 37 extends into the opening 59 and is pivotally connected to the bar member 56 by a transverse pivot pin 60. The lever 37 is slidably receivable in the slot 58, and is formed with the inclined end portion 61 received in the opening 59 so that the bar 56 may be at times folded to a position closely adjacent to the member 35, as shown in dotted view in FIGURE 1, so as to present minimum cross-sectional size for allowing the gauging mechanism to pass through the neck 14 of a tank during the installation thereof, as above mentioned.

The pivotal connection defined by the pivot pin 60 is located above the center of gravity of the bar member 56, as viewed in FIGURE 1, so that the bar member normally tends to assume a vertical position, such as that illustrated in FIGURE 1. A generally U-shaped liner or insert 63' is secured in the opening 59, said insert being of steel or similar wear-resisting material, protecting the walls of the opening 59 against wear. The pivot pin 60 extends through the sides of said insert. A transverse fastening pin 63 also extends through the walls of opening 59 and through the sides of insert 63' to secure the insert in said opening.

The apparatus is installed in a tank 12 by folding the elements to the compact configuration shown in dotted view in FIGURE 1, whereby the member 52 may be first passed through the neck 14, along with the lever 43, the lever 37 and bar member 56 being folded adjacent to the member 35 so as to be passed through the neck 14. The external threads 31 on the depending conduit portion 16 of the housing 15 are then interengaged with the internal threads in the neck 14 to firmly and sealingly secure the conduit member 16 in the neck.

In operation, the relatively short lever 37 abuts the shoulder 45 of the long lever at its tranverses edge 40, the relatively heavy bar 56 assuming a vertical position and cooperating with the relatively light member 52 to adjust the position of the link rod 47 in accordance with the level of the liquid 13 in the tank. The bar 56 will cooperate with the buoyant force acting on the member 52 to balance the gravitation force exerted on the member 52 and will maintain the member 52 at a position depending upon the depth of liquid 13 in the tank. Thus, as shown in FIGURE 1, the member 52 will assume a position which may be submerged below the level of the liquid, said position resulting from the balancing of the respective weights of the member 52 and the member 56 by the respective buoyant forces acting on these members. Since the lever 43 moves in accordance with the movement of the member 52, the link rod 30 will be adjusted in accordance with the changes in the position of member 52. The motion of the link rod 30 is transmitted through the crank arm 29 to the pointer shaft 23, whereby the pointer 22 rotates in accordance with the movement of link rod 30 and indicates on the dial plate 21 the height of the liquid 13 in the tank. The dial plate is suitably calibrated in accordance with the type of liquid contained in the tank and the known response characteristics of the gauge mechanism.

By employing a material of relatively small density for the member 52 and a material of relatively large density for the member 56, a relatively large displacement ratio, as between that of the member 52 and the member 56 may be obtained. While a relatively light metal, such as magnesium, or the like, may be employed for the member 52, other materials of relatively small density may be employed within the spirit of the present invention. Similarly, while a relatively heavy metal such as lead may be employed for the bar 56, other relatively dense materials may be found suitable for this purpose and may be used within the spirit of this invention.

As will be readily apparent, the shape of the bar 56 may be altered to provide a desired cross-sectional area, and similarly, the shape of the member 52 may be varied within the spirit of the present invention.

As will be readily understood, the cross-sectional area of the member 56 determines the volume of liquid displaced thereby and thus is a factor in determining the buoyant force exerted on the member 56. Other factors involved in the design of the apparatus include the density of the material selected for the member 52, the density of the liquid 13, the length of the relatively long lever 43 as compared with the length of the relatively short lever 37 and the location of the pivot pin 51 with respect to the pivotal connection pin 42 of the levers.

As above mentioned, the apparatus is especially useful in gauging liquids having a density substantially less than that of water, for example, hydrocarbon liquids, such as propane, butane, or the like.

While a specific embodiment of an improved liquid gauge device has been disclosed in the foregoing description, it will be understood that various modifications with-

What is claimed is:

1. A liquid gauge device of the character described comprising a support, a guage dial on said support, a pointer shaft journaled on said support, a pointer on said shaft extending adjacent said dial, a crank member secured on said shaft, a depending arm secured to said support, a relatively long first lever member pivoted to the lower portion of said arm, an elongated solid body of relatively light metal formed with an open-ended longitudinal slot, means pivotally connecting the free end of said first lever member to said body in said slot, a relatively short second lever member pivoted to the lower portion of said arm, an abutment shoulder on the pivoted end of said first lever member, means on the pivoted end of said second lever member drivingly engageable with said abutment shoulder, an elongated solid body of relatively heavy metal formed with an open-ended longitudinal slot, means pivotally connecting the free end of said short second lever member in said last-named slot, and a link rod connecting said first lever member to said crank member.

2. A liquid gauge device of the character descirbed cured on said shaft, a depending arm secured to said support, a pointer shaft journaled in said support substantially concentrically with said dial, a pointer on said shaft extending adjacent said dial, a crank bar secured on said shaft, a depending, downwardly and laterally inclined arm secured to said support a relatively long first lever member pivoted at one end thereof to the lower portion of said arm, an elongated solid body of relatively light metal formed with an open-ended longitudinal slot, means pivotally connecting the free end of said first lever member to said body in said slot, a relatively short second lever member pivoted at one end thereof to the lower portion of said arm, an abutment shoulder on the pivoted end of said first lever member located below the pivotal connection thereof, means on the pivoted end of said second lever member drivingly engageable with said abutment shoulder, an elongaed solid body of relatively heavy metal formed with an open-ended longitudinal slot, means pivotally connecting the free end of said short second lever member in said last-named slot, and a link rod connecting a point on said first lever member adjacent its pivotal connection to said crank bar.

3. A liquid gauge device of the character described comprising a support, a circular gauge dial on said support, a pointer shaft journaled in said support substantially concentrically with said dial, a pointer on said shaft extending adjacent said dial, a crank bar secured on said shaft, a depending downwardly and laterally inclined arm secured to said support, a relatively long first lever member pivoted at one end thereof to the lower portion of said arm, an elongated solid body of magnesium formed with an open-ended longitudinal slot, means pivotally connecting the free end of said first lever member to said body in said slot, a relatively short second lever member pivoted at one end thereof to the lower portion of said arm, an abutment shoulder on the pivoted end of said first lever member located below the pivotal connection thereof, means on the pivoted end of said second lever member drivingly engageable with said abutment shoulder, a float member comprising an elongated solid body of lead formed with an open-ended longitudinal slot extending through its intermediate portion, means pivotally connecting the free end of said short second lever member in said last-named slot, and a link rod connecting a point on said first lever member adjacent its pivotal connection to said crank bar.

4. A liquid gauge device of the character described comprising a support, a gauge dial on said support, a pointer shaft journaled in said support, a pointer on said shaft extending adjacent said dial, a crank member secured on said shaft, a depending arm secured to said support, a relatively long first lever member pivoted at one end to the lower portion of said arm, an elongated counterweight formed with an open-ended longitudinal slot, means pivotally connecting the free end of said first lever to said counterweight in said slot, whereby said counterweight is movable substantially into longitudinal alignment with the first lever member, a relatively short second lever member, laterally projecting lug means at one end of the second lever member pivoted to the lower portion of said arm, whereby said second lever member is movable substantially into side-by-side relation with said arm, means on the second lever member drivingly engageable with the pivoted end of said first lever member, an elongated float member having an open-ended longitudinal slot, means pivotally connecting the free end of said short second lever to said float member in said last-named slot, whereby said float member is movable to a position wherein it is approximately in longitudinal alignment with said second lever member and in longitudinally contacting relation with said arm, and a link rod connecting said first lever member to said crank member.

5. A liquid gauge device of the character described comprising a support, a gauge dial on said support, a pointer shaft journaled in said support, a pointer on said shaft extending adjacent said dial, a crank member secured on said shaft, a depending arm secured to said support, a relatively long first lever member pivoted at one end to the lower portion of said arm, an elongated counterweight formed with an open-ended longitudinal slot, means pivotally connecting the free end of said first lever to said counterweight in said slot, whereby said counterweight is movable substantially into longitudinal alignment with the first lever member, a relatively short second lever member, laterally projecting lug means at one end of the second lever member pivoted to the lower portion of said arm, whereby said second lever member is movable substantially into side-by-side relation with said arm, an abutment shoulder on the pivoted end of said first lever member, means on the pivoted end of said second lever member drivingly engageable with said abutment shoulder, an elongated float member having an open-ended longitudinal slot, means pivotally connecting the free end of said short second lever to said float member in said last-named slot, whereby said float member is movable to a position wherein it is approximately in longitudinal alignment with said second lever member and in longitudinally contacting relation with said arm, and a link rod connecting said first lever member to said crank member.

6. A liquid gauge device of the character described for mounting on a container having a threaded opening, comprising: a support including a housing and a conduit element, said element being threaded for engagement in said opening, a gauge dial on said housing, a pointer shaft journaled in said housing, a pointer on said shaft extending adjacent said dial, a crank bar secured on said shaft, a depending, downwardly and laterally inclined arm secured to and having a maximum width no greater than that of said element, a relatively long first lever member pivoted at one end to the lower portion of said arm and also having a maximum width no greater than that of said element, an elongated counterweight having an open-ended longitudinal slot, means pivotally connecting the free end of said first lever member in said slot, whereby the counterweight is movable into coaxial alignment with said lever member, the counterweight having a maximum width no greater than that of said conduit element, a relatively short second lever member, laterally projecting lug means on the second lever member, means pivotally connecting said lug means to the lower portion of the arm, whereby the second lever member is movable between an operative position and a folded position in which it extends in side-by-side relation to the lower portion of the arm, an abutment shoulder on the pivoted end of said first lever member located below the pivotal connection thereof, means on the pivoted end of said second lever member drivingly engageable with said abutment shoulder in the operative position of the second member, an elongated float member having an open-ended longitudinal slot, means pivotally connecting the free end of said short second lever member in said last-named slot, whereby said float member is movable into coaxial alignment with said second lever member, said lower portion of the arm, said second lever member and said float member in the folded position of the second lever member with the float member aligned therewith, being of a maximum width no greater than that of the conduit element when measured at any point along the length of the float member and second lever member, and a link rod connecting a point on said first lever member adjacent its pivotal connection to said crank bar.

References Cited in the file of this patent

UNITED STATES PATENTS

| | | |
|---|---|---|
| 229,571 | Vanduzen | July 6, 1880 |
| 863,623 | Mower et al. | Aug. 20, 1907 |
| 1,634,165 | Williams | June 28, 1927 |
| 1,922,362 | Halversen | Aug. 15, 1933 |
| 1,997,002 | Ledoux | Apr. 9, 1935 |
| 2,021,615 | Stuart | Nov. 19, 1935 |
| 2,277,445 | Mele | Mar. 24, 1942 |
| 2,697,350 | Sorber | Dec. 21, 1954 |

FOREIGN PATENTS

| | | |
|---|---|---|
| 878 | Great Britain of 1852 | Nov. 26, 1852 |
| 657,319 | France | Jan. 15, 1929 |
| 948,100 | France | Jan. 24, 1949 |
| 698,090 | Great Britain | Oct. 7, 1953 |